United States Patent
Moore et al.

(10) Patent No.: US 8,626,918 B2
(45) Date of Patent: Jan. 7, 2014

(54) WORKLOAD ALLOCATION BASED UPON HEAT RE-CIRCULATION CAUSES

(75) Inventors: Justin Moore, Durham, NC (US); Parthasarathy Ranganathan, Fremont, CA (US); Ratnesh Sharma, Union City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3099 days.

(21) Appl. No.: 11/129,987

(22) Filed: May 16, 2005

(65) Prior Publication Data
US 2006/0259622 A1 Nov. 16, 2006

(51) Int. Cl.
*G06F 15/173* (2006.01)
*G06F 9/46* (2006.01)

(52) U.S. Cl.
USPC .............. 709/226; 709/223; 718/105

(58) Field of Classification Search
USPC .................. 709/223, 226; 718/105
See application file for complete search history.

(56) References Cited

U.S. PATENT DOCUMENTS

| | | | |
|---|---|---|---|
| 6,104,003 A * | 8/2000 | Jones | 219/400 |
| 6,374,627 B1 * | 4/2002 | Schumacher et al. | 62/259.2 |
| 6,415,617 B1 * | 7/2002 | Seem | 62/186 |
| 6,795,928 B2 * | 9/2004 | Bradley et al. | 713/320 |
| 6,889,908 B2 * | 5/2005 | Crippen et al. | 236/49.3 |
| 2002/0004915 A1 * | 1/2002 | Fung | 713/320 |
| 2004/0228087 A1 * | 11/2004 | Coglitore | 361/687 |

OTHER PUBLICATIONS

Moore, J. et al., "Making Scheduling "Cool": Temperature-Aware Workload Placement in Data Centers", Apr. 13, 2005.

* cited by examiner

*Primary Examiner* — Ranodhi Serrao

(57) ABSTRACT

A method of allocating workload among servers in a geographically collocated cluster of compute equipment includes calibrating causes of heat re-circulation in the cluster of compute equipment. In addition, workload is allocated among the servers to address causes of the heat re-circulation to reduce costs associated with cooling the compute equipment.

23 Claims, 6 Drawing Sheets

WORKLOAD ALLOCATION BASED UPON HEAT RE-CIRCULATION CAUSES

BACKGROUND

A data center may be defined as a location, for instance, a room that houses computer systems arranged in a number of racks. A standard rack, for example, an electronics cabinet, is defined as an Electronics Industry Association (EIA) enclosure, 78 in. (2 meters) high, 24 in. (0.61 meter) wide and 30 in. (0.76 meter) deep. These racks are configured to house a number of computer systems, about forty (40) systems, with future configurations of racks being designed to accommodate 200 or more systems. The computer systems typically include a number of printed circuit boards (PCBs), mass storage devices, power supplies, processors, micro-controllers, and semi-conductor devices, that dissipate relatively significant amounts of heat during their operation. For example, a typical computer system containing multiple microprocessors dissipates approximately 250 W of power. Thus, a rack containing forty (40) computer systems of this type dissipates approximately 10 KW of power.

Current approaches to provisioning cooling to dissipate the heat generated by the cooling systems are typically based on using energy balance to size the air conditioning units and intuition to design air distributions in the data center. In many instances, the provisioning of the cooling is based on the nameplate power ratings of all of the servers in the data center, with some slack for risk tolerance. This type of cooling provisioning oftentimes leads to excessive and inefficient cooling solutions. This problem is further exacerbated by the fact that in most data centers, the cooling is provisioned for worst-case or peak load scenarios. Since it is estimated that typical data center operations only utilize a fraction of the servers, provisioning for these types of scenarios often increases the inefficiencies found in conventional cooling arrangements.

As such, it would be beneficial to have effective thermal management that does not suffer from the inefficiencies found in conventional data center cooling arrangements.

SUMMARY OF THE INVENTION

A method of allocating workload among servers in a geographically collocated cluster of compute equipment is disclosed herein. In the method, causes of heat re-circulation in the cluster of compute equipment are calibrated. In addition, workload is allocated among the servers to address causes of the heat re-circulation to reduce costs associated with cooling the compute equipment.

BRIEF DESCRIPTION OF THE DRAWINGS

Features of the present invention will become apparent to those skilled in the art from the following description with reference to the figures, in which.

DETAILED DESCRIPTION OF THE INVENTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

The effectiveness of a server thermal package generally depends on external environmental controls to maintain inlet air temperatures within a safe operating range below the "redline" of approximately 25° C. A variety of factors may cause temperature variations and thermal hot spots due to, for instance, heat re-circulation, in a geographically collocated cluster of compute equipment (hereinafter "data center"), such as, a data center, a collection of racks, a single rack, a cluster of servers, etc. For instance, non-uniform equipment loads in the data center may cause some areas to have higher temperatures as compared with other areas, while irregular airflows may cause some areas to have lower temperatures than other areas. In data centers having relatively high heat densities, for instance, heat dissipation of around 2000 W/m$^2$ (200 W/ft$^2$) or more, mixing of hot and cold streams generally leads to complex airflow patterns that can create hot spots. Hot spots typically create a risk of redlining servers by exceeding the specified maximum inlet air temperature, damaging electronic components and causing them to fail prematurely. In addition, thermal imbalances often interfere with efficient cooling operation.

As described in greater detail herein below, the inefficiencies and potential hazards often associated with heat re-circulation may be substantially reduced, thereby leading to a more efficient and safer operating environment for the components in the data center. The heat re-circulation may be reduced through workload placement on various groups of servers based upon the calculated effects the workload placement has on the various groups of servers. In this regard, methods and algorithms are described below that may be implemented to determine the causes of the re-circulation and to determine workload placement distributions that address the causes of the re-circulation and to thereby reduce the re-circulation in the data center.

Figure 1A:
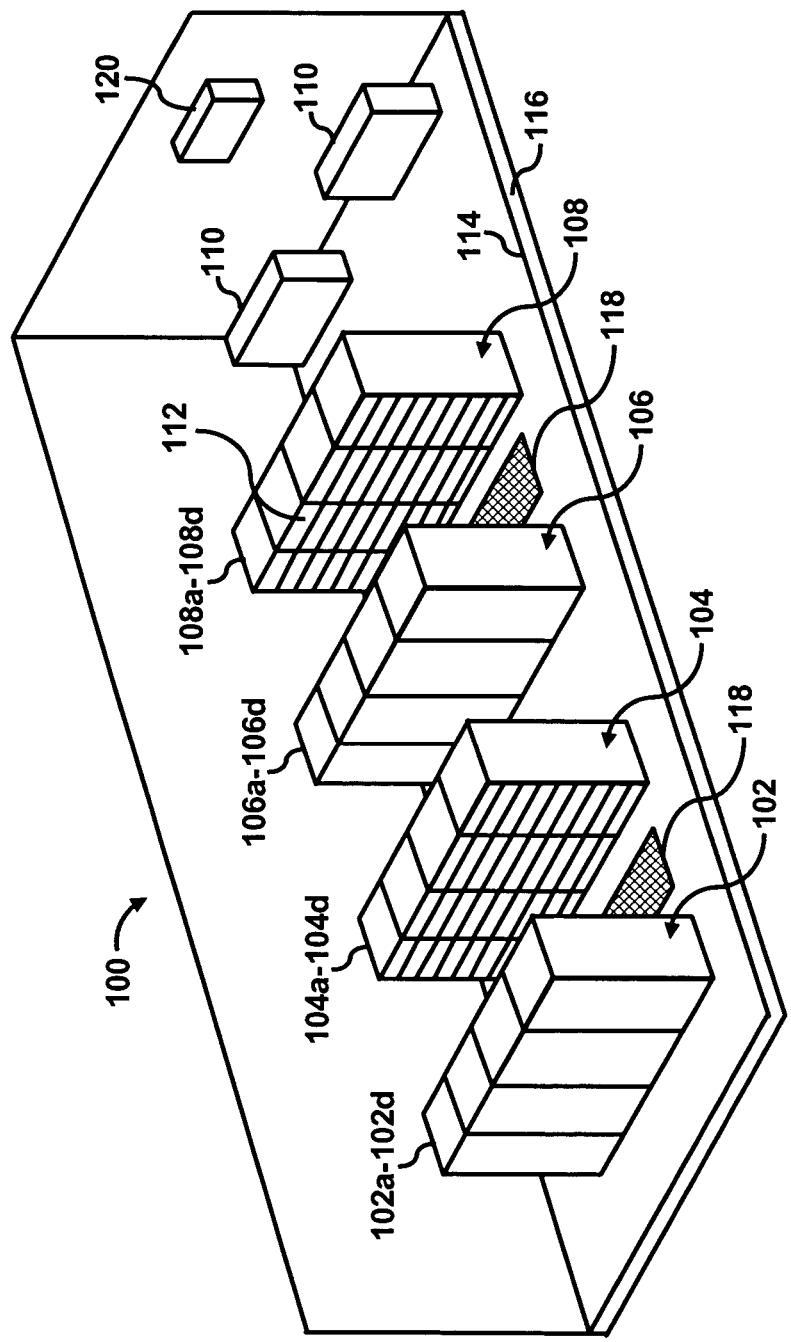
FIG. 1A shows a simplified perspective view of a data center, according to an embodiment of the invention.

With reference first to FIG. 1A, there is shown a simplified perspective view of a data center 100. The terms "data center" are generally meant to denote a room or other space and are not meant to limit the invention to any specific type of room where data is communicated or processed, nor should it be construed that use of the terms "data center" limits the invention in any respect other than its definition hereinabove. The terms "data center" as referenced throughout the present disclosure may also denote any physically collocated collection of computing equipment, such as, for instance, computing equipment contained in a single rack, a cluster of racks, etc. In addition, although particular reference is made throughout to CRAC units, various other types of air conditioning units may be employed. For instance, if the "data center" as referenced herein comprises a rack of computing equipment, the CRAC units may comprise, for instance, server air conditioning units, fans and cooling systems specific to the rack, etc.

The data center 100 depicted in FIG. 1A represents a generalized illustration and other components may be added or existing components may be removed or modified without departing from a scope of the data center 100. For example, the data center 100 may include any number of racks and various other apparatuses known to be housed in data centers. Thus, although the data center 100 is illustrated as containing four rows of racks 102-108 and two computer room air conditioning (CRAC) units 110, it should be understood that the data center 100 may include any number of racks, for instance, 100 racks, and CRAC units 110. The depiction of four rows of racks 102-108 and two CRAC units 110 is thus for illustrative and simplicity of description purposes only and is not intended to limit the data center 100 in any respect.

The data center 100 is depicted as having a plurality of racks 102-108, for instance, electronics cabinets, aligned in substantially parallel rows. The racks 102-108 are illustrated as having open front sides such that the components 112 housed therein are visible. It should, however, be understood that the data center 100 may include racks 102-108 having panels that cover the front sides of the racks 102-108 without departing from a scope of the data center 100.

The components 112 may comprise, for instance, computers, servers, monitors, hard drives, disk drives, etc., designed to perform various operations, for instance, computing, switching, routing, displaying, etc. These components 112 may comprise subsystems (not shown), for example, processors, micro-controllers, high-speed video cards, memories, semi-conductor devices, and the like to perform these functions. In the performance of these electronic functions, the subsystems and therefore the components 112, generally dissipate relatively large amounts of heat. Because the racks 102-108 have generally been known to include upwards of 200 or more components 112, they may require substantially large amounts of cooling resources to maintain the subsystems and the components 112 generally within predetermined operating temperature ranges.

A relatively small number of components 112 are illustrated as being housed in the racks 102-108 for purposes of simplicity. It should, however, be understood that the racks 102-108 may include any number of components 112, for instance, forty or more components 112, or 200 or more blade systems. In addition, although the racks 102-108 are illustrated as containing components 112 throughout the heights of the racks 102-108, it should be understood that some of the racks 102-108 may include slots or areas that do not include components 112 without departing from the scope of the racks 102-108.

The rows of racks 102-108 are shown as containing four racks (a-d) positioned on a raised floor 114. A plurality of wires and communication lines (not shown) may be located in a space 116 beneath the raised floor 114. The space 116 may also function as a plenum for delivery of cooling airflow from the CRAC units 110 to the racks 102-108. The cooled airflow may be delivered from the space 116 to the racks 102-108 through a plurality of vent tiles 118 located between some or all of the racks 102-108. The vent tiles 118 are shown in FIG. 1A as being located between racks 102 and 104 and 106 and 108. One or more temperature sensors (not shown) may also be positioned in the space 116 to detect the temperatures of the airflow supplied by the CRAC units 110.

The CRAC units 110 generally operate to receive heated airflow from the data center 100, cool the heated airflow, and to deliver the cooled airflow into the plenum 116. The CRAC units 110 may comprise vapor-compression type air conditioning units, water-chiller type air conditioning units, etc. In one regard, the CRAC units 110 may operate in manners generally consistent with conventional CRAC units 110. Alternatively, the CRAC units 110 and the vent tiles 118 may be operated to vary characteristics of the cooled airflow delivery as described, for instance, in commonly assigned U.S. Pat. No. 6,574,104, filed on Oct. 5, 2001, which is hereby incorporated by reference in its entirety.

In an ideal system, the airflow delivered into the racks 102-108 comprises only the cooled airflow supplied directly by the CRAC units 110 and the airflow returning into the CRAC units 110 comprises only the airflow heated by the components 112 in the racks 102-108. However, there are typically areas in the data center 100 where the cooled airflow and the heated airflow mix. In other words, there typically are areas in the data center 100 where the airflow heated by the components 112 re-circulates back into the cooled airflow prior to the cooled airflow being supplied into the racks 102-108. By way of example, cooled air may mix with heated air around the sides or over the tops of one or more of the racks 102-108. A metric for quantifying the amount of heat that re-circulates in the data center 100 has previously been termed the return heat index (RHI) in co-pending and commonly assigned U.S. patent application Ser. No. 10/446,854, filed on May 29, 2003, the disclosure of which is hereby incorporated by reference in its entirety.

As disclosed in that co-pending application, RHI may be determined through the following equation:

Equation (1):

$$RHI = \frac{Q}{Q + \delta Q},$$

where Q is the total heat produced by the components 112 and $\delta Q$ is the amount of heat that re-circulates in the data center 100. As the amount of re-circulating heat approaches zero, RHI approaches one. Thus, RHI is a measure of the amount of heat that exits from the components 112 and flows directly into the CRAC unit 110 return vents without re-circulating back into the component 112 inlets.

U.S. patent application Ser. No. 10/446,854 generally focuses on the consequences of the re-circulation. The present disclosure differs from that application by focusing more on the causes of the re-circulation.

As such, higher RHI values are indicative of lower heat re-circulation, which correspond to lower costs associated with cooling. Typically, smaller differences in RHI at higher utilization produce a more pronounced difference in cooling cost because of the total amount of heat in the system. More particularly, a data center 100 with the same RHI at low and high utilizations has more total heat re-circulating at higher utilizations, and thus the costs associated with cooling the data center 100 are higher. Various systems and methods are described herein below to distribute power amongst the components 112 in manners that substantially minimize the total amount of heat recirculation in the data center 100 while substantially maximizing the power budget, and therefore, the potential utilization, of each component 112.

With reference back to FIG. 1A, there is also shown a resource manager 120, depicted as an individual computing device. Although the resource manager 120 is illustrated as being separate from and located away from the racks 102-108, the resource manager 120 may also comprise a server or other computing device housed in one of the racks 102-108.

In addition, if the resource manager 120 is comprised in a server or other computing device, the resource manager 120 may be implemented on the local application scheduler level, the operating system, virtual machine scheduler, hardware, etc. In any regard, the resource manager 120 is generally configured to control various operations in the data center 100. For instance, the resource manager 120 may be configured to control power distribution amongst the various components 112, as described in greater detail herein below. As another example, the resource manager 120 may be configured to control various operations of the CRAC units 110 and the vent tiles 118, collectively considered herein as the cooling system.

The CRAC units 110 may include sensors (not shown) configured to detect at least one environmental condition, for instance, temperature, pressure, humidity, etc. These sensors may comprise any reasonably suitable conventional sensors configured to detect one or more of these environmental conditions. The sensors may be positioned at various locations of the data center 100. The sensors may be positioned, for instance, to detect the temperature of the cooled airflow supplied by the CRAC units 110. The sensors may comprise devices separate from the CRAC units 110 or they may comprise devices integrated with the CRAC units 110.

Figure 1B:
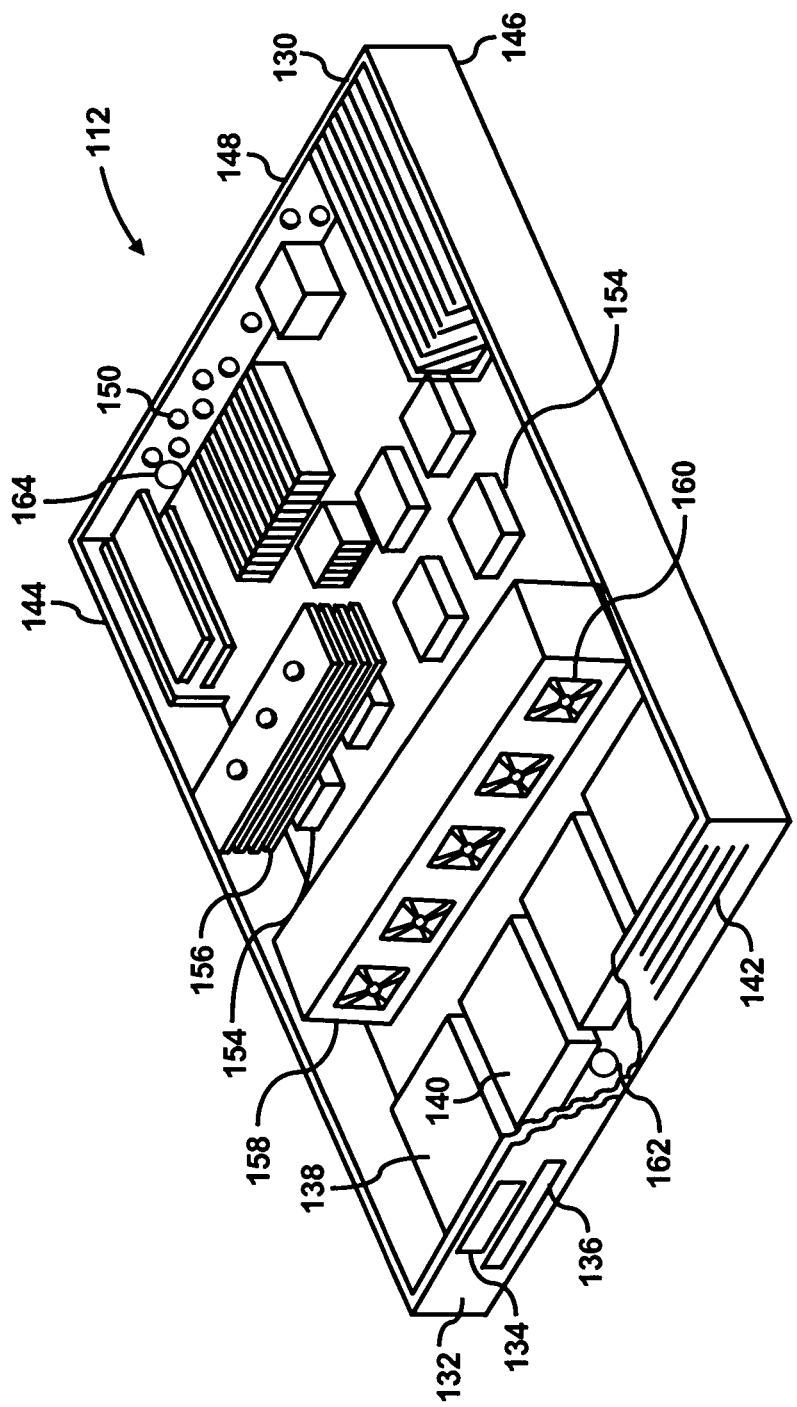
FIG. 1B is a perspective view of a component that may be housed in the racks depicted in FIG. 1A.

FIG. 1B is a perspective view of a component 112, depicted here as a server, that may be housed in the racks 102-108 depicted in FIG. 1A. The component 112 may comprise a server that is configured for substantially horizontal mounting in a rack 102-108 or a server that is configured for substantially vertical mounting in a rack 102, 108, such as, a blade system. In any regard, the component 112 will be considered as a server throughout the remainder of the present disclosure. In addition, it should be understood that the server 112 depicted in FIG. 1B represents a generalized illustration and, therefore, other devices and design features may be added or existing devices or design features may be removed, modified, or rearranged without departing from the scope of the server 112. For example, the server 112 may include various openings for venting air through an interior of the server 112. As another example, the various devices shown in the server 112 may be re-positioned, removed, or changed.

As shown in FIG. 1B, the server 112 includes a housing 130 with a top section of the housing 130 removed for purposes of illustration. In addition, a part of a front section 132 of the housing 130 has been cut-away to more clearly show some of the devices contained in the server 112. The front section 132 is illustrated as containing various features to enable access to various devices contained in the server 112. For instance, the front section 132 is shown as including openings 134 and 136 for insertion of various media, for example, diskettes, flash memory cards, CD-Roms, etc. Located substantially directly behind the openings 134 and 136 are data storage devices 138 and 140 configured to read and/or write onto the various media. The front section 132 also includes vents 142 for enabling airflow into an interior of the housing 130.

The housing 130 also includes a plurality of side sections 144 and 146 and a rear section 148. The rear section 148 includes openings 150 to generally enable airflow out of the housing 130. Although not clearly shown in FIG. 1B, the rear section 148 also includes openings for insertion of wires, cables, and the like, into the housing 130 for connection to various devices contained in the housing 130. In addition, some of the openings 150 in the rear section 148 may include devices to enable the interfacing of certain devices contained in the housing 130 with various other electronic devices.

Contained within the housing 130 is a plurality of electronic components 154 which, during operation, generate heat (hereinafter referred to as "heat-generating devices"). Some of the heat-generating devices 154 may comprise microprocessors, power converters, memory controllers, power supplies, disk drives, etc. In addition, some of the heat-generating devices 154 may include heat sinks 156 configured to dissipate relatively larger amounts of heat generated by these devices 154 by providing a relatively larger surface area from which heat may be dissipated through convection.

Also illustrated in the server 112 is an optional fan cell 158. The fan cell 158 is considered optional because the additional airflow produced through use of the fan cell 158 may not be required in certain servers 112. In any regard, the optional fan cell 158 is depicted as being composed of fans 160 for blowing air through the server 112. The optional fan cell 158 is depicted as containing five fans 160 for illustrative purposes only and may therefore contain any reasonably suitable number of fans, for instance, from 1 to 10 or more fans. The fans 160 contained in the fan cell 158 may comprise relatively low capacity fans or they may comprise high capacity fans that may be operated at low capacity levels. In addition, the fans may have sufficiently small dimensions to enable their placement in the housing 130 without, for instance, substantially interfering with the operations of other devices contained in the server 112. Moreover, the optional fan cell 158 may be positioned at locations in or around the server 112 without departing from a scope of the server 112.

The server 112 is also illustrated as including an inlet sensor 162 and an outlet sensor 164. The inlet sensor 162 may comprise a sensor configured to detect temperature of airflow supplied into the server 112. Likewise, the outlet sensor 164 may be configured to detect the temperature of the airflow exiting the server 112. In this regard, the sensors 162 and 164 may comprise any reasonably suitable temperature sensors, such as, a thermocouples, thermistors, thermometers, etc. In addition, the sensors 162 and 164 may be integrally manufactured with the server 112 or the sensors 162 and 164 may be installed in the server 112 as an after-market device.

In addition, or alternatively, the inlet sensor 162 and the outlet sensor 164 may comprise pressure sensors, which may be used to determine a pressure drop across the server 112. In this case, the inlet and outlet sensors 162 and 164 may be employed to calculate the mass flow rate of air flow through the server 112. More particularly, the mass airflow rate may be correlated to a detected pressure drop across the server 112.

The mass airflow rate through the server 112 may also, or alternatively, be determined through use of other means. In a first example, the mass airflow rate may be calculated as a function of the speeds at which the fans 160 in the fan cell 158 are operated. In a second example, the mass airflow rate may be detected directly through use of an anemometer, for instance.

As will be described in greater detail below, the temperature measurements obtained through use of the temperature sensor 162 and the mass flow rate of airflow through the server 112, along with other information, may be employed to calculate the amount of heat re-circulating in the server 112 and the data center 100. The calculated re-circulation amount may be employed to determine power distribution schemes amongst the various servers 112 to substantially minimize the total amount of heat recirculation in the data center 100, while substantially maximizing the power budget, and therefore, the potential utilization, of each server 112. Initially, however, a system depicting an environment in which various power distribution methods may be implemented is discussed with respect to FIG. 2.

Figure 2:
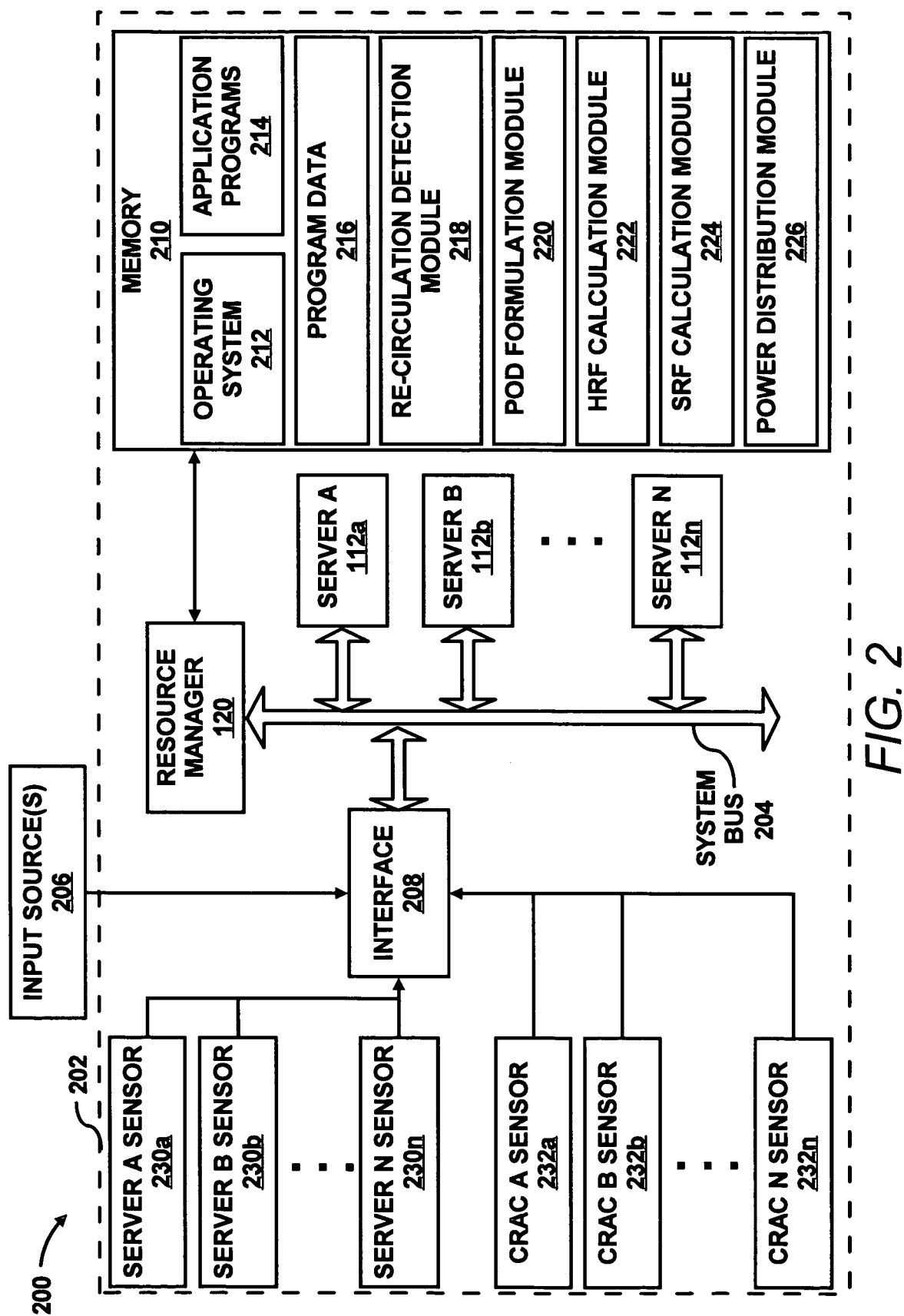
FIG. 2 is a block diagram of a power distribution system according to an embodiment of the invention.

More particularly, FIG. 2 is a block diagram 200 of a power distribution system 202 that may implement the power distribution methods described below. It should be understood that the following description of the block diagram 200 is but one manner of a variety of different manners in which such a power distribution system 202 may be configured. In addition, it should be understood that the power distribution system 202 may include additional components and that some of the components described herein may be removed and/or modified without departing from the scope of the power distribution system 202. For instance, the power distribution system 202 may include any number of sensors, servers, CRAC units, etc., as well as other components, which may be implemented in the operations of the power distribution system 202.

As shown, the power distribution system 202 may comprise a general computing environment and includes the resource manager 120 depicted in FIG. 1A. As described herein above, the resource manager 120 is configured to perform various functions in the data center 100. In this regard, the resource manager 120 may comprise a computing device, for instance, a computer system, a server, etc. In addition, the resource manager 120 may comprise a microprocessor, a micro-controller, an application specific integrated circuit (ASIC), and the like, configured to perform various processing functions. In one respect, the resource manager 120 may comprise a controller of another computing device. Alternatively, the resource manager 120 may comprise software operating in a computing device.

Data may be transmitted to various components of the power distribution system 202 over a system bus 204 that operates to couple the various components of the power distribution system 202. The system bus 204 represents any of several types of bus structures, including, for instance, a memory bus, a memory controller, a peripheral bus, an accelerated graphics port, a processor bus using any of a variety of bus architectures, and the like.

One or more input sources 206 may be employed to input information into the power distribution system 202. The input sources 206 may comprise, for instance, computing devices connected over an internal network or an external network, such as, the Internet. The input sources 206 may also comprise peripheral devices, such as, a disk drive, removable media, flash drives, a keyboard, a mouse, and the like. The input sources 206 may be used, for instance, as a means to request that a workload or application be performed by some of the servers 112 in the data center 100. By way of example, a request to perform a multimedia application may be received into the power distribution system 202 from or through an input source 206.

The resource manager 120 may communicate with the input source 206 via an Ethernet-type connection or through a wired protocol, such as IEEE 802.3, etc., or wireless protocols, such as IEEE 802.11b, 802.11g, wireless serial connection, Bluetooth, etc., or combinations thereof. In addition, the input source 206 may be connected to the resource manager 120 through an interface 208 that is coupled to the system bus 204. The input source 206 may, however, be coupled by other conventional interface and bus structures, such as, parallel ports, USB ports, etc.

The resource manager 120 may be connected to a memory 210 through the system bus 204. Alternatively, the resource manager 120 may be connected to the memory 210 through a memory bus, as shown in FIG. 2. Generally speaking, the memory 210 may be configured to provide storage of software, algorithms, and the like, that provide the functionality of the power distribution system 202. By way of example, the memory 210 may store an operating system 212, application programs 214, program data 216, and the like. The memory 210 may be implemented as a combination of volatile and non-volatile memory, such as DRAM, EEPROM, MRAM, flash memory, and the like. In addition, or alternatively, the memory 210 may comprise a device configured to read from and write to a removable media, such as, a floppy disk, a CD-ROM, a DVD-ROM, or other optical or magnetic media.

The memory 210 may also store modules programmed to perform various power distribution functions. More particularly, the memory 210 may store a re-circulation detection module 218, a pod formulation module 220, a heat re-circulation factor (HRF) calculation module 222, a summed re-circulation factor (SRF) calculation module 224, and a power distribution module 226. The resource manager 120 may implement one or more of the modules 218-226 stored in the memory 210 to perform some or all of the power distribution methods described herein below.

The power distribution system 202 also includes a plurality of server sensors A-N $230a$-$230n$ configured to detect one or more conditions in respective servers $112a$-$112n$. As shown, the "n" denoting the sever sensors A-N $230a$-$230n$ and the servers A-N $112a$-$112n$, indicates a non-negative integer. In addition, the ellipses between server sensor $230b$ and the server sensor $230n$ generally indicate that the power distribution system 202 may include any reasonably suitable number of sensors. Moreover, the ellipses between the server $112b$ and server $112n$ generally indicate that the resource manager 120 may allocate power to any reasonably suitable number of servers 112. Data collected by the sensors $230a$-$230n$ may be communicated to the resource manager 120 through the interface 208. The interface 208 may comprise at least one of hardware and software configured to enable such data transfer.

Data collected by additional sensors $232a$-$232n$ may also be communicated to the resource manager 120 through the interface 208. The additional sensors A-N $232a$-$232n$ generally comprise sensors positioned and configured to detect the temperatures of airflow supplied by respective CRAC units 110, as shown in FIG. 2. The ellipses between the CRAC B sensor $232b$ and the CRAC N sensor $232n$ generally denote that the resource manager may receive temperature information from any reasonably suitable number of CRAC sensors $232a$-$232n$.

The data received from the server sensors $230a$-$230n$ and the CRAC sensors $232a$-$232n$ may be stored in the memory 210. In addition, the stored data may be used in various algorithms described below in determining how power is to be distributed among the servers $112a$-$112n$. In this regard, for instance, the resource manager 120 may implement the re-circulation detection module 218 to detect re-circulation based upon the conditions detected by the server sensors $230a$-$230n$ and the CRAC sensors $232a$-$232n$.

The resource manager 120 may implement the pod formulation module 220 to bin the servers $112a$-$112n$ into pods, where each pod contains s servers. The resource manager 120 may additionally implement the HRF calculation module 222 to calculate the heat re-circulation factor (HRF) for each of the pods based upon the detected re-circulation. In addition, the resource manager 120 may implement the SRF calculation module 224 to calculate a summed re-circulation factor (SRF). The resource manager 120 may, moreover, implement the power distribution module 226, which comprises a means for allocating workload among a plurality of servers, to determine the power distributions for the pods based upon the calculated SRF and the HRF calculated for the respective pods.

Various manners in which the power distributions for the pods may be determined and in certain instances, implemented, are described in greater detail herein below with respect to the FIGS. 3 and 4.

Figure 3:
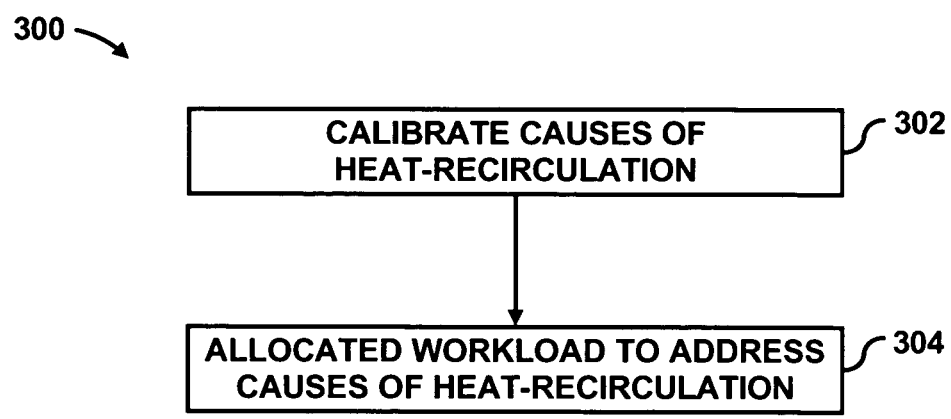
FIG. 3 illustrates a flow diagram of method for distributing power among servers, according to an embodiment of the invention.

With reference first to FIG. 3, there is shown a flow diagram of a method 300 for distributing power among servers 112a-112n to address causes of heat re-circulation and to substantially maximize power budgets of the servers 112a-112n, according to an example. It is to be understood that the following description of the method 300 is but one manner of a variety of different manners in which an embodiment of the invention may be practiced. It should also be apparent to those of ordinary skill in the art that the method 300 represents a generalized illustration and that other steps may be added or existing steps may be removed, modified or rearranged without departing from a scope of the method 300.

The description of the method 300 is made with reference to the block diagram 200 illustrated in FIG. 2, and thus makes reference to the elements cited therein. It should, however, be understood that the method 300 is not limited to the elements set forth in the block diagram 200. Instead, it should be understood that the method 300 may be practiced by a power distribution system having a different configuration than that set forth in the block diagram 200.

At step 302, the causes of heat re-circulation in a geographically collocated cluster of compute equipment are calibrated. The calibration of the causes of heat re-circulation may include calibration through at least one of modeling and actual measurements of the cluster of compute equipment. In addition, at step 304, workload is allocated among the servers to address causes of the heat re-circulation to reduce costs associated with cooling the compute equipment. The workload may be allocated in a number of different manners. For instance, the workload may be allocated through linear sorting, as described herein. As another example, the workload may be allocated according to the discretization approaches disclosed in co-pending and commonly assigned U.S. patent application Ser. No. 11/129,988, now U.S. Pat. No. 7,461,273, filed on even date herewith, and entitled "Power Distribution Among Servers", the disclosure of which is hereby incorporated by reference in its entirety.

The steps outlined in the method 300 are described in greater detail herein below with respect to FIG. 4. In addition, FIG. 4 describes additional steps that may be performed in conjunction with the steps outlined in the method 300.

Figure 4:
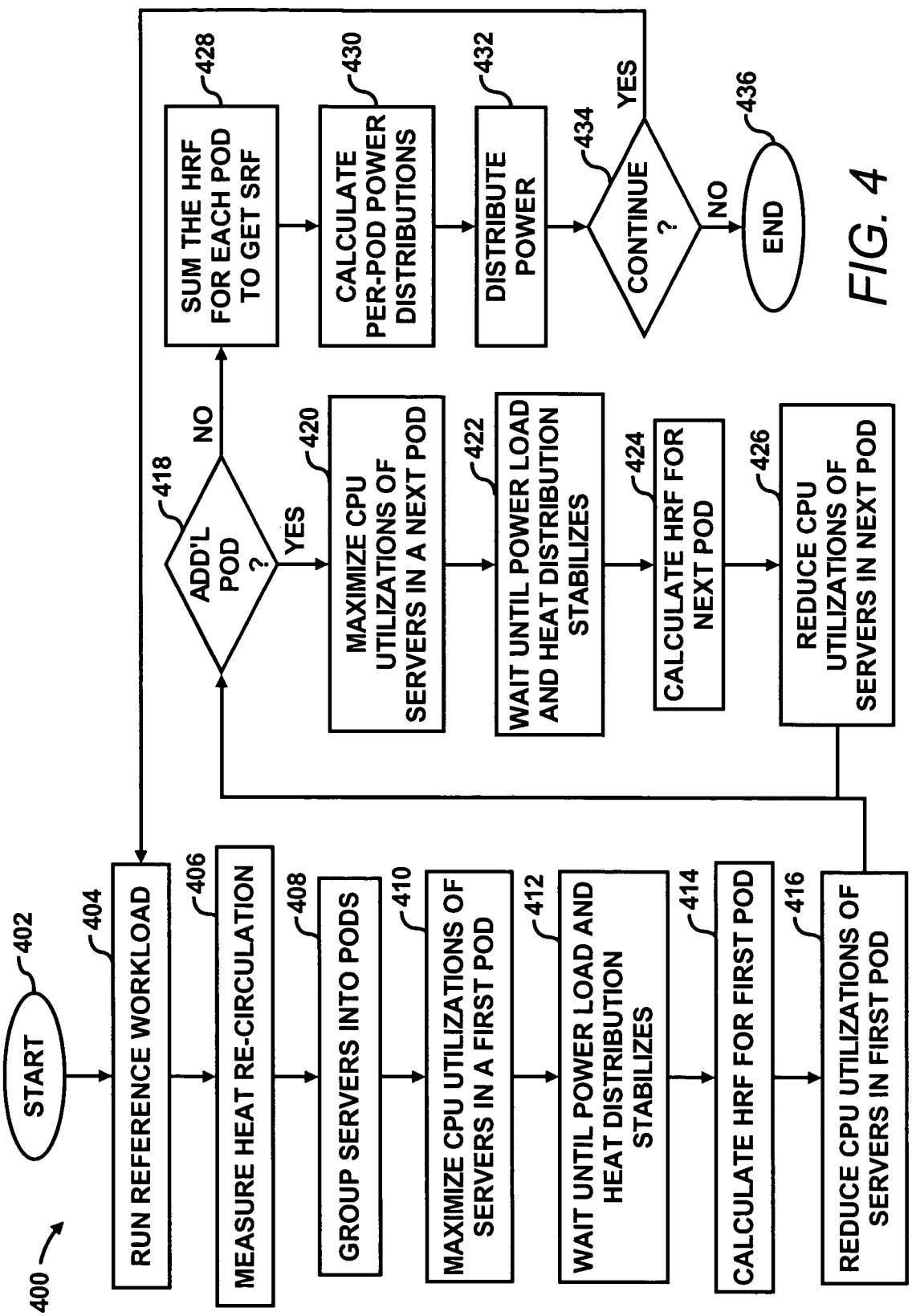
FIG. 4 shows a flow diagram of a method for distributing power among servers, according to an embodiment of the invention.

With reference now to FIG. 4, there is shown a flow diagram of a method 400 for distributing power among servers 112a-112n to address causes of heat re-circulation and to substantially maximize power budgets of the servers 112a-112n. It is to be understood that the following description of the method 400 is but one manner of a variety of different manners in which an embodiment of the invention may be practiced. It should also be apparent to those of ordinary skill in the art that the method 400 represents a generalized illustration and that other steps may be added or existing steps may be removed, modified or rearranged without departing from a scope of the method 400.

The description of the method 400 is made with reference to the block diagram 200 illustrated in FIG. 2, and thus makes reference to the elements cited therein. It should, however, be understood that the method 400 is not limited to the elements set forth in the block diagram 200. Instead, it should be understood that the method 400 may be practiced by a power distribution system having a different configuration than that set forth in the block diagram 200.

The method 400 may generally be implemented to substantially minimize the total heat re-circulation in the data center 100 while substantially maximizing the power budget, and therefore the potential utilization, of the servers 112a-112n. More particularly, the method 400 may be implemented to determine how power should be distributed among the servers 112a-112n to substantially achieve these goals. In addition, the method 400 may include allocation of power to the servers 112a-112n based upon the determined distribution scheme.

The method 400 may be initiated, for instance, through receipt of a workload or application request by the resource manager 120 at step 402. In addition or alternatively, the method 400 may be manually initiated, initiated according to an operating schedule, etc. Once initiated, the resource manager 120 may run a reference workload that generates a given amount of heat, $Q_{ref}$, at step 404. More particularly, the resource manager 120 may cause one or more of the servers 112a-112n to operate at the reference workload at step 404. At step 406, the resource manager 120 may implement the re-circulation detection module 218 to calculate the amount of heat re-circulation, $\delta Q_{ref}$, in the data center 100. In other words, the re-circulation detection module 218 comprises a means for calculating heat re-circulation levels. The amount of heat re-circulation, $\delta Q_{ref}$, may be determined through the following equation:

Equation (2):

$$\delta Q_{ref} = \sum_{i=1}^{n} C_p \cdot m_i \cdot (T_i^{in} - T_{sup}).$$

In Equation (2), n is the number of servers in the data center 100, $C_p$ is the specific heat of air, $m_i$ is the mass flow of air through server i, which may be in kg/sec, $T_i^{in}$ is the inlet temperature for server i, and $T_{sup}$ is the temperature of the cooled air supplied by the CRAC units 110. The variables in Equation (2) may be detected or calculated in various manners as described hereinabove with respect to FIG. 2. Generally speaking, in a data center having no heat re-circulation, $\delta Q_{ref}=0$, $T_i^{in}$ will equal $T_{sup}$ for each server 112a-112n. In any respect, the calculated heat re-circulation $\delta Q_{ref}$ may be stored in the memory 210.

At step 408, the servers 112a-112n may be grouped or binned into pods, where each pod contains s servers 112a-112n. More particularly, for instance, the resource manager 120 may implement the pod formulation module 220 to group or bin the servers 112a-112n into the pods. The servers 112a-112n may be grouped into the pods according to their geographic locations. In addition, the servers 112a-112n that are located in relatively close proximities to each other may be grouped into respective pods. The number of servers 112a-112n grouped into the pods may be based upon, for instance, the amount of required to perform the distribution of workload among the servers 112a-112n, the amount of acceptable loss in accuracy pertaining to grouping the servers 112a-112n into pods, etc.

At step 410, for a first pod j, the central processing unit (CPU) utilizations for the servers 112a-112n in the first pod j are maximized, thereby increasing the overall data center 100 power consumption and heat re-circulation, $\delta Q_{ref}$. A period of time is allowed to elapse, at step 412, to enable the new power load and the heat distribution to substantially stabilize. The period of time may comprise a set time based upon the magnitude of the power load change. In addition, or alternatively, the period of time elapsed at step 412 may be equivalent to a period of time during which conditions in the data center 100 are monitored to determine when the power load and heat distribution have substantially stabilized.

In any respect, at step 414, the heat re-circulation factor (HRF) for the first pod j may be calculated. More particularly, the resource manager 120 may implement the HRF calculation module 222, which comprises a means for calculating a heat re-circulation factor for a plurality of servers, to calculate the HRF for the first pod j based upon the following equation:

Equation (3):

$$HRF_j = \frac{Q_j - Q_{ref}}{\delta Q_j - \delta Q_{ref}} = \frac{\Delta Q_j}{\Delta \delta Q_j}.$$

In Equation (3), $Q_j$ is the new amount of heat generated with the CPU utilizations of the servers 112a-112n in the first pod j maximized and $\delta Q_j$ is the amount of heat re-circulation with the CPU utilizations of the servers 112a-112n in the first pod j maximized. The HRF for the first pod may therefore be defined as a ratio of the difference in heat generated by the pod j and all of the servers 112a-112n over the difference in the heat re-circulation of the pod j and all of the servers 112a-112n. The HRF for the first pod j may be stored in the memory 210. In addition, at step 416, the CPU utilizations of the servers 112a-112n in the first pod j may be reduced to the reference workload level set at step 404.

At step 418, it may be determined as to whether the HRF of another pod is to be calculated. If a "yes" condition is reached, the CPU utilizations for the servers 112a-112n in the another or next pod, j+1, may be maximized at step 420. As stated above with respect to step 410, the increased CPU utilizations increases the overall data center 100 power consumption and heat re-circulation, $\delta Q_{ref}$. A period of time is allowed to elapse, at step 422, to enable the new power load and the heat distribution to substantially stabilize, as described above with respect to step 412.

At step 424, the HRF for the next pod, j+1, may be calculated in manners as described above with respect to step 414. The HRF for the next pod, j+1, may also be stored in the memory 210. In addition, at step 426, the CPU utilizations of the servers 112a-112n in the next pod j+1 may be reduced to the reference workload level set at step 404.

Following step 426, it may again be determined whether the HRF for another pod is to be calculated at step 418. If a "yes" condition is reached, steps 420-426 may be repeated for the another pod to thereby calculate the HRF for the another pod. In addition, steps 420-426 may be repeated to calculate the HRF's of the remaining pods.

In any event, if a "no" condition is reached at step 418, a summed re-circulation factor (SRF) may be calculated at step 428. More particularly, the resource manager 120 may implement the SRF calculation module 224 to calculate the SRF based upon the following equation:

Equation (4):

$$SRF = \sum_{j=1}^{\frac{n}{s}} HRF_j.$$

In Equation (4), n is the number of servers in the data center 100 and s is the number of servers in a pod. As shown by Equation (4), the SRF is the sum of the HRF's for each of the pods.

At step 430, power distribution allocations for the pods may be calculated. More specifically, the power distribution allocation for a particular pod may be determined by multiplying the total power load by that pod's HRF by the SRF.

At step 432, power may be distributed to the servers 112a-112n contained in the pods according to the power distribution allocated to the pods at step 430. In one respect, the power may be substantially evenly distributed among the servers 112a-112n in the respective pods, such that, the sum of the power distributed to the servers 112a-112n of a particular pod equal the power distribution allocated to that pod. In addition or alternatively, power may be distributed to further reduce inefficiencies in cooling the servers 112a-112n. For instance, power may be distributed in one or more of the manners disclosed and described in co-pending and commonly assigned U.S. patent application Ser. No. 11/129,988, now U.S. Pat. No. 7,461,273, filed on even date herewith, and entitled "Power Distribution Among Servers", the disclosure of which is hereby incorporated by reference in its entirety.

Thus, by way of example, the method 400 may determine various geographic locations, and more particularly, sets of servers 112a-112n, at which various levels of power are to be distributed to substantially reduce heat re-circulation. In addition, the methods described in the co-pending application Ser. No. 11/129,988 may be used to further refine workload placement among the sets of servers 112a-112n and thus further improve cooling efficiency.

At step 434, it may be determined as to whether the method 400 is to continue. The method 400 may be continued for a predetermined period of time, a predetermined number of iterations, substantially indefinitely, etc. If it is determined that the method 400 is to continue, steps 404-434 may be repeated until it is determined that the method 400 is to discontinue. In this case, the method 400 may be discontinued once the period of time has elapsed, the number of iterations has been performed, manually discontinued, etc. If it is determined that the method 400 is to be discontinued, the method 400 may end as indicated at step 436.

Through implementation of the method 400, the heat re-circulation from each pod will be identical because of the amount of workload placed on each of the pods. As such, the power budget for each pod may substantially be maximized. That is, the number of pods with sufficient power to run a workload may substantially be maximized while substantially minimizing the total heat re-circulation in the data center 100 by effectively addressing the causes of the heat re-circulation in the data center 100.

The operations set forth in the methods 300 and 400 may be contained as a utility, program, or subprogram, in any desired computer accessible medium. In addition, the methods 300 and 400 may be embodied by a computer program, which can exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 5:
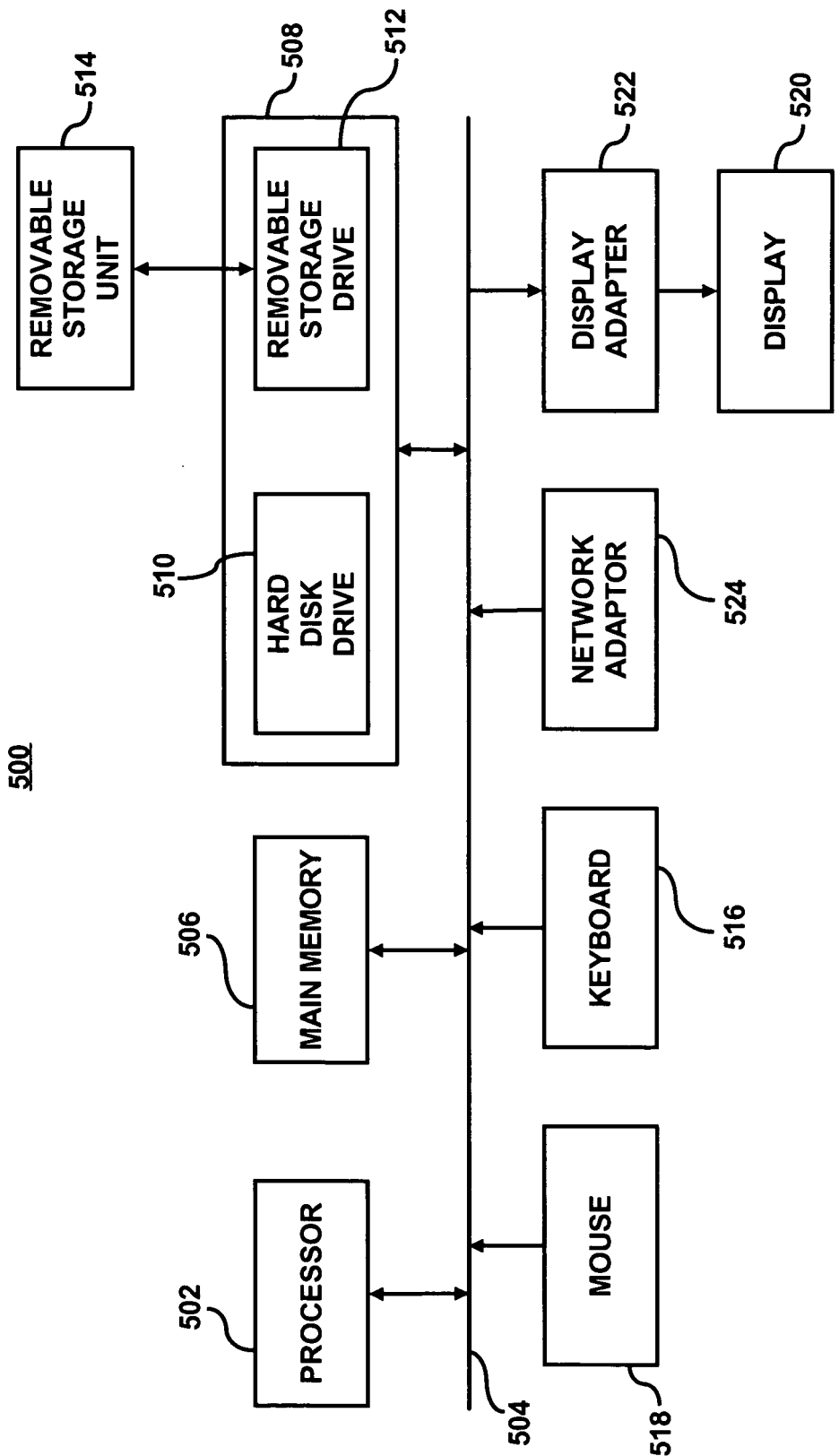
FIG. 5 illustrates a computer system, which may be employed to perform the various functions of the power distribution system, according to an embodiment of the invention.

FIG. 5 illustrates a computer system 500, which may be employed to perform the various functions of the resource manager 120 described hereinabove, according to an embodiment. In this respect, the computer system 500 may be used as a platform for executing one or more of the functions described hereinabove with respect to the resource manager 120.

The computer system 500 includes one or more controllers, such as a processor 502. The processor 502 may be used to execute some or all of the steps described in the methods 300 and 400. Commands and data from the processor 502 are communicated over a communication bus 504. The computer system 500 also includes a main memory 506, such as a random access memory (RAM), where the program code for, for instance, the resource manager 120, may be executed during runtime, and a secondary memory 508. The secondary memory 508 includes, for example, one or more hard disk drives 510 and/or a removable storage drive 512, representing a floppy diskette drive, a magnetic tape drive, a compact disk drive, etc., where a copy of the program code for the power distribution system may be stored.

The removable storage drive 510 reads from and/or writes to a removable storage unit 514 in a well-known manner. User input and output devices may include a keyboard 516, a mouse 518, and a display 520. A display adaptor 522 may interface with the communication bus 504 and the display 520 and may receive display data from the processor 502 and convert the display data into display commands for the display 520. In addition, the processor 502 may communicate over a network, for instance, the Internet, LAN, etc., through a network adaptor 524.

It will be apparent to one of ordinary skill in the art that other known electronic components may be added or substituted in the computer system 500. In addition, the computer system 500 may include a system board or blade used in a rack in a data center, a conventional "white box" server or computing device, etc. Also, one or more of the components in FIG. 5 may be optional (for instance, user input devices, secondary memory, etc.).

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method of allocating workload among servers in a geographically collocated cluster of compute equipment, said method comprising steps performed by a computer system of:

calculating a first heat re-circulation level resulting from a first server utilization level of the compute equipment;

calculating a second heat re-circulation level resulting from a second server utilization level of the compute equipment, wherein the first and second heat re-circulation levels are measures of an infiltration of heated airflow into cooled airflow prior to the heated and cooled airflow being supplied into one or more of the servers;

calculating a heat re-circulation factor (HRF) for the cluster of compute equipment from the first heat re-circulation level and the second heat re-circulation level, wherein the HRF is a ratio of the difference in heat generated at the first server utilization level and at the second server utilization level over the difference in the heat re-circulation generated at the first server utilization level and at the second server utilization level; and allocating workload among the servers based upon the calculated heat re-circulation factor.

2. The method according to claim 1, wherein the step of calculating the first heat re-circulation levels further comprises calculating the first and second heat re-circulation levels, $\delta Q_{ref}$, through the following equation:

$$\delta Q_{ref} = \sum_{i=1}^{n} c_p - m_i - (T_i^{in} - T_{sup}),$$

wherein n is the number of servers in the cluster of compute equipment, $C_p$ is the specific heat of air, $m_i$ is the mass flow of air through server i, $T_i^{in}$ is the inlet temperature for server i, and $T_{sup}$ is the temperature of the cooled air supplied by at least one air conditioning unit.

3. The method according to claim 1, further comprising:
running a reference workload on the servers prior to the step of calculating the heat re-circulation level in the cluster of compute equipment at the first server utilization level, wherein the reference workload is correlated to the first server utilization level.

4. The method according to claim 1, further comprising:
grouping the servers into a plurality of pods, wherein each of the pods contains at least one server, and wherein each server comprises at least one central processing unit (CPU);
maximizing CPU utilizations of the servers grouped into a first pod; and
wherein the step of calculating the heat re-circulation level in the cluster of compute equipment at the second server utilization level further comprises calculating the heat re-circulation level in the cluster of compute equipment with the CPU utilizations of the servers grouped into the first pod maximized.

5. The method according to claim 4, wherein the step of grouping the servers further comprises grouping the servers according to a trade-off between the amount of time required to allocate workload among the servers and the amount of accuracy loss related to the grouping of the servers.

6. The method according to claim 4, further comprising:
calculating a heat re-circulation factor (HRF) for the first pod, wherein the HRF is characterized by the following equation:

$$HRF_j = \frac{Q_j - Q_{ref}}{\delta Q_j - \delta Q_{ref}} = \frac{\Delta Q_j}{\Delta \delta Q_j},$$

wherein j is the pod identification, $Q_j$ is the amount of heat generated at the second server utilization level, $Q_{ref}$ is the amount of heat generated at the first server utilization level, $\delta Q_{ref}$ is the amount of heat re-circulation generated at the second server utilization level, and $\delta Q_{ref}$ is the amount of heat re-circulation generated at the first server utilization level.

7. The method according to claim 4, further comprising:
reducing CPU utilizations of the servers grouped into the first pod to the first server utilization level;

maximizing CPU utilizations of the servers grouped into a second pod, thereby creating a third server utilization level;

calculating a third heat re-circulation level in the cluster of compute equipment at the third server utilization level; and wherein the step of allocating workload among the servers further comprises allocating workload among the servers based upon the first, second, and third heat re-circulation levels.

8. The method according to claim 7, further comprising: calculating a heat re-circulation factor (HRF) for the second pod, wherein the HRF is characterized by the following equation:

$$HRF_j = \frac{Q_j - Q_{ref}}{\delta Q_j - \delta Q_{ref}} = \frac{\Delta Q_j}{\Delta \delta Q_j},$$

wherein j is the pod identification, $Q_j$ is the amount of heat generated at the second server utilization level, $Q_{ref}$ is the amount of heat generated at the first server utilization level, $\delta Q_j$ is the amount of heat re-circulation generated at the second server utilization level, and $\delta Q_{ref}$ is the amount of heat re-circulation generated at the first server utilization level.

9. The method according to claim 4, further comprising:
sequentially maximizing CPU utilizations of the servers grouped into the remaining pods;
sequentially measuring heat re-circulation at different server utilization levels according to which of the CPU utilizations of the remaining pods are maximized; and
sequentially reducing the CPU utilizations of the servers following measuring of the heat re-circulation at the associated server utilization levels.

10. The method according to claim 9, further comprising:
calculating a heat re-circulation factor (HRF) for each of the pods, wherein the HRF is characterized by the following equation:

$$HRF_j = \frac{Q_j - Q_{ref}}{\delta Q_j - \delta Q_{ref}} = \frac{\Delta Q_j}{\Delta \delta Q_j},$$

wherein j is the pod identification, $Q_j$ is the amount of heat generated at the second server utilization level, $Q_{ref}$ is the amount of heat generated at the first server utilization level, $\delta Q_j$ is the amount of heat re-circulation generated at the second server utilization level, and $\delta Q_{ref}$ is the amount of heat re-circulation generated at the first server utilization level;
summing the HRF's of each of the pods; and
wherein the step of allocating workload among the servers further comprises allocating workload among the servers contained in pods maximize CPU utilizations of the servers contained in the pods.

11. The method according to claim 1, wherein the step of allocating the workload further comprises allocating the workload based upon linear sorting.

12. The method according to claim 1, wherein the step of allocating the workload further comprises allocating the workload based upon discretization approaches.

13. A computing device for allocating power among a plurality of servers, said computing device comprising:
a re-circulation detection module for calculating a first heat re-circulation level resulting from a first server utilization level of the compute equipment and a second heat re-circulation level resulting from a second server utilization level of the compute equipment, wherein the first and second heat re-circulation levels are measures of an infiltration of heated airflow into cooled airflow prior to the heated and cooled airflow being supplied into one or more of the servers;
a heat re-circulation factor (HRF) calculation module for calculating a HRF for the plurality of servers based upon on the first and second heat re-circulation levels, wherein the HRF is a ratio of the difference in heat generated at the first server utilization level and at the second server utilization level over the difference in the heat re-circulation generated at the first server utilization level and at the second server utilization level; and
a resource manager configured to allocate workload among the plurality of servers based upon the heat re-circulation factor.

14. The computing device according to claim 13, said system further comprising:
server temperature sensors configured to detect the temperatures of airflow at respective inlets of the plurality of servers;
a CRAC unit temperature sensor configured detect the temperature of airflow supplied by the CRAC unit; and
wherein the resource manager is further configured to receive the detected server inlet temperatures and the CRAC unit supply temperature, said resource manager being configured to calculate the first and second heat re-circulation levels based upon the detected server inlet temperatures and the CRAC unit supply temperature.

15. The computing device according to claim 14, wherein said plurality of servers each include at least one central processing unit (CPU), and wherein the resource manager is further configured to vary the CPU utilizations of the plurality of servers and to calculate heat re-circulation levels at the various CPU utilizations, and wherein said resource manager is further configured to allocate workload among the plurality of servers based upon the heat re-circulation levels calculated at the various CPU utilizations, to thereby reduce heat re-circulation.

16. The computing device according to claim 13, wherein the resource manager is further configured to solve the following equation to calculate the first and second heat re-circulation levels, $\delta Q_{ref}$:

$$\delta Q_{ref} = \sum_{i=1}^{n} c_p - m_i - (T_i^{in} - T_{sup}),$$

wherein n is the number of servers, $C_p$ is the specific heat of air, $m_i$ is the mass flow of air through server i, $T_i^{in}$ is the inlet temperature for server i, and $T_{sup}$ is the temperature of the cooled air supplied by the CRAC unit.

17. The computing device according to claim 13, wherein the resource manager is further configured to group the plurality of servers into a number of pods, wherein each of the pods contains at least one server, and wherein the resource manager is further configured to maximize the CPU utilizations of the servers grouped into a first pod to thereby calculate the heat re-circulation caused by the maximized CPU utilizations.

18. The computing device according to claim 17, wherein the resource manager is further configured to sequentially maximize the CPU utilizations of the servers grouped into the remaining pods to thereby calculate the heat re-circulation caused by the maximized CPU utilizations for the remaining pods.

19. The computing device according to claim 13, wherein the heat re-circulation factor calculation module is further configured to calculate a heat re-circulation factor (HRF) for each of the pods, wherein the heat re-circulation factor calculation module is configured to calculate the HRF for each of the pods through the following equation:

$$HRF_j = \frac{Q_j - Q_{ref}}{\delta Q_j - \delta Q_{ref}} = \frac{\Delta Q_j}{\Delta \delta Q_j},$$

wherein j is the pod identification, $Q_j$ is the amount of heat generated at a second CPU utilization level, Qref, is the amount of heat generated at a first CPU utilization level, $\delta Q_j$ is the amount of heat re-circulation generated at the second CPU utilization level, and $\delta Q_{ref}$ is the amount of heat re-circulation generated at the first CPU utilization level.

20. The computing device according to claim 19, further comprising:
a summed re-circulation factor calculation module configured to sum the HRF's of each of the pods through the following equation:

$$SRF = \sum_{j=1}^{\frac{n}{s}} HRF_j,$$

wherein SRF is the summed re-circulation factor for the pods j, n is the number of servers, and s is the number of servers in a pod; and
wherein the resource manager is further configured to allocate workload to the plurality of servers according to their respective pods based upon a correlation between the HRF of the pod and the SRF.

21. The computing device according to claim 20, wherein the resource manager is further configured to allocate power to the pods according to a multiplication of the total power by the HRF of the pod by the SRF.

22. A geographically collocated cluster of compute equipment having a system for allocating workload among a plurality of servers, each having at least one central processing unit (CPU), said data center comprising:
means for calculating heat re-circulation levels in the cluster of compute equipment at different utilization levels of the plurality of servers, wherein the heat re-circulation levels are measures of an infiltration of heated airflow into cooled airflow prior to the heated and cooled airflow being supplied into one or more of the plurality of servers;
means for calculating a heat re-circulation factor for the plurality of servers based upon the calculated heat re-circulation levels, wherein the heat re-circulation factor is a ratio of the difference in heat generated at the first server utilization level and at a second server utilization level over the difference in the heat re-circulation generated at the first server utilization level and at the second server utilization level; and
means for allocating workload among the plurality of servers based upon the calculated heat re-circulation factor.

23. A non-transitory computer readable storage medium on which is embedded one or more computer programs, said one or more computer programs implementing a method of allocating workload among servers in a cluster of compute equipment, said one or more computer programs comprising a set of instructions for:
calculating a first heat re-circulation level resulting from a first server utilization level of the compute equipment;
calculating a second heat re-circulation level resulting from a second server utilization level of the compute equipment, wherein the first and second heat re-circulation levels are measures of an infiltration of heated airflow into cooled airflow prior to the heated and cooled airflow being supplied into one or more of the servers;
calculating a heat re-circulation factor (HRF) for the cluster of compute equipment from the first heat re-circulation level and the second heat re-circulation level, wherein the HRF is a ratio of the difference in heat generated at the first server utilization level and at the second server utilization level over the difference in the heat re-circulation generated at the first server utilization level and at the second server utilization level; and
allocating workload among the servers based upon the calculated heat re-circulation factor.

* * * * *

UNITED STATES PATENT AND TRADEMARK OFFICE
CERTIFICATE OF CORRECTION

PATENT NO. : 8,626,918 B2  
APPLICATION NO. : 11/129987  
DATED : January 7, 2014  
INVENTOR(S) : Justin Moore et al.

Page 1 of 1

It is certified that error appears in the above-identified patent and that said Letters Patent is hereby corrected as shown below:

In the Claims

In column 16, line 9, in Claim 13, before "the" delete "on".

In column 16, line 24, in Claim 14, after "configured" insert --to--.

In column 17, line 16, in Claim 19, delete "Qref," and insert -- $Q_{ref}$, --, therefor.

In column 18, line 13, in Claim 22, delete "at the" and insert -- at a --, therefor.

Signed and Sealed this  
Tenth Day of June, 2014

Michelle K. Lee  
*Deputy Director of the United States Patent and Trademark Office*